United States Patent [19]

Masuda et al.

[11] Patent Number: 4,614,586
[45] Date of Patent: Sep. 30, 1986

[54] SEMIPERMEABLE POLYMERIC FILM MEMBRANE

[75] Inventors: Hitoshi Masuda, Abiko; Koichi Takada, Kyoto; Yoshiro Nakata, Ibaraki, all of Japan

[73] Assignees: Director-General of Agency of Industrial Science & Technology, Tokyo; Sanyo Kasei Kogyo Kabushiki Kaisha, Kyoto, both of Japan

[21] Appl. No.: 426,276

[22] Filed: Sep. 29, 1982

[30] Foreign Application Priority Data

Aug. 9, 1982 [JP] Japan ............................ 57-138104

[51] Int. Cl.$^4$ .............................................. B01D 13/04
[52] U.S. Cl. ............................ 210/500.28; 210/500.41
[58] Field of Search ............... 210/500.2, 654; 55/158; 521/27; 429/253, 254; 204/296

[56] References Cited

U.S. PATENT DOCUMENTS 4,302,336 11/1981 Kawaguchi et al. ............... 210/654
4,326,958 4/1982 Kawahara et al. ............... 210/500.2

OTHER PUBLICATIONS

T. Masuda et al, "Polymerization of 1-Chloro-2-Phenylacetylene Induced by UV Irradiation of Mo(CO)$_6$"- *Journal of Polymer Science*, Polymer Chemistry Edition, vol. 20, 1043-1050, 1982.

*Primary Examiner*—David Sadowski
*Attorney, Agent, or Firm*—Stephen F. K. Yee

[57] ABSTRACT

A semipermeable membrane having a surface comprised of a poly(arylacetylene) having at least a part of its benzene nuclei introduced with sulfonic acid groups. The poly(arylacetylene) is represented by the following structural formula (I):

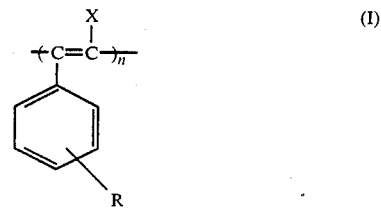

wherein X stands for Cl, Br or CH$_3$, R stands for H or CH$_3$ and n is a positive integer. The semipermeable membrane may be obtained by subjecting a membrane formed of the poly(arylacetylene) of the formula (I) to sulfonation conditions or by sulfonating the poly(arylacetylene) of the formula (I), and forming the sulfonated product into membrane.

7 Claims, No Drawings

SEMIPERMEABLE POLYMERIC FILM MEMBRANE

BACKGROUND OF THE INVENTION

This invention relates to a novel semipermeable membrane.

Semipermeable membranes are now used in a wide variety of fields such as waste-water treatment, desaltnation of sea water, food industries and medicinal industries for the purpose of separating a solute from a solution, concentrating a solution or recovering the solvent from a solution. Because of their effectiveness in saving energy and resources, semipermeable membranes will be used more and more in the future.

In the separation technique using semipermeable membranes, reverse osmosis, ultrafiltration or dialysis is generally adopted according to the type of the solution to be treated and the object of the treatment. Thus, the optimum properties of semipermeable membranes also vary depending on the type of the solution to be treated and the object of the treatment. However, the following properties are generally commonly required for semipermeable membranes: a high selectivity in separation of a solute from a fluid (ability of rejecting the passage of the solute through the membrane); a high flux rate (rate of the flux of the solvent through the membrane); a high resistance to heat and chemicals such as an alkali, acid and oxidizing agent; and a high mechanical strength.

Nowadays a variety of semipermeable membranes are commercially available but these membranes fail to completely satisfy the above-described requirements. Therefore, known semipermeable membranes suffer from various drawbacks in practice. For example, a membrane made of acetyl cellulose, which is the most common semipermeable membrane, lacks in chemical and thermal stability and is also susceptible to biodegradation. Membranes composed of a polyamide or polyacrylonitrile are defective in stability to heat and strong alkali and resistance to oxidizing agent such as chlorine gas. Membranes formed of polyvinyl chloride, polyvinyl acetate or polyvinyl carbonate have a defect that the step of forming membranes encounters with considerable difficulty and the resulting membranes have not sufficiently high semipermeability. Among currently available ultrafiltration membranes, polysulfone-type membranes are known to have the highest quality. They are, however, poor in chemical resistance and, moreover, their selectivity is not satisfactory.

SUMMARY OF THE INVENTION

It is, therefore, an object of the present invention to provide an economical membrane which shows both a high flux rate of permeates and a high selectivity, which is chemically stable and which has an excellent mechanical strength.

In accomplishing the foregoing object, the present invention provides a semipermeable membrane having a surface formed of poly(arylacetylene) having at least a part of its benzene nuclei introduced with sulfonic acid groups. The poly(arylacetylene) has the following structural formula:

$$\left(C=C\right)_n$$

with substituents X and R on the benzene ring, wherein X stands for Cl, Br or $CH_3$, R stands for H or $CH_3$ and n is a positive integer. The advantages accruing from the introduction of the sulfonic acid groups into poly(arylacetylene) are as follows:

(1) Hydrophilicity is increased so that not only the flux rate of fluids but also the selectivity increases.

(2) Donnan effect of the membranes induced by sulfonic acid groups makes it possible to separate ions from non-ionic solutes and also to separate specific ions from a mixture of ionic solutes.

(3) The membranes are imparted with resistance to organic solvents so that they may be applicable to organic fluid systems.

(4) The sulfonated polymer can be crosslinked with multivalent metal ions. The crosslinked membranes are very stable and allow the separation treatment with a high rate and selectivity for a long period of time.

DETAILED DESCRIPTION OF THE INVENTION

The poly(arylacetylene) used in the present invention is derived from at least one of the following monomers:

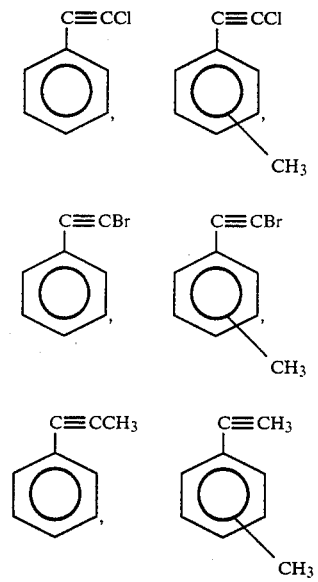

A mixture of two or more of these monomers may be used for the preparation of the poly(arylacetylene) of this invention. Among these monomers phenylchloroacetylene is the most preferable monomer in this invention.

The above monomer or monomers are subjected to polymerization conditions in the presence of a catalyst. As the catalyst, so called Ziegler-Natta catalyst systems are generally suitable for such substituted acetylene compounds. Catalysts developed by Higashimura, Nasuda and coworkers of Kyoto University Japan have been found to be applicable to the polymerization of the substituted acetylene compounds. The catalyst are compounds of Mo, W, Nb or Ta. Especially, Mo compounds are useful for the polymerization of the arylacetylene monomers. Among Mo compound, Mo(CO)$_6$ and MoCl$_5$ are the most effective catalysts. However, it is necessary to expose Mo(CO)$_6$ to UV radiation in the presence of an organic halide to initiate the polymerization (Polymer Bulletin 2, 823-827 (1980)). Illustrative of the organic halides are CH$_3$Cl, CH$_2$Cl$_2$, CHCl$_3$, CCl$_4$ and chlorobenzene. If an organic halide is employed as solvent for polymerization it is not necessary to use an additional organic halide. Among these organic halides, CCl$_4$ is the most preferable polymerization solvent.

The amount of the catalyst is generally in the range of 0.1–10 mol % based on the amount of the monomer. As for ultraviolet radiation source, ultraviolet lamp of 100 W–1 KW power generating near ultraviolet radiation may be suitably employed. However, sunlight may be utilized for starting polymerization. Irradiation time depends on the intensity of light. It is generally 5 min. to 1 hr at a temperature in the range of 0°–100° C. with a distance of 30 cm from the radiation source. Organic halides and aromatic hydrocarbons are suitable for use as solvent for polymerization, the latter being generally used when the monomer has a halogen atom like phenylchloroacetylene. The monomer concentration ranges from 0.1 to 5 mol/l, and the polymerization temperature ranges from 0° to 60° C. The time required to complete the polymerization is generally 10–30 hrs depending on the concentration of monomer and catalyst amount used and also temperature.

Another method in which MoCl$_5$ is employed as a catalyst has been developed also by Higashimura and Masuda et al. This catalyst requires neither organic halides nor UV radiation. Instead, it requires a co-catalyst such as tetraphenyl tin (Ph$_4$(Sn)). In this case, as solvent an aromatic hydrocarbon is employed. Other polymerization conditions such as monomer and catalyst concentration, temperature and time are similar to those of the above-described Mo(CO)$_6$-h$\nu$ system. But two points should be noted. Namely, the quantity of MoCl$_5$ and Ph$_4$(Sn) should be equivalent mole, and MoCl$_5$ is very susceptible of humidity.

Arylacetylene polymers obtained by the above two procedures have not any substantial differences but the former procedure (Mo(CO)$_6$-h$\nu$) gives higher molecular weight of polymers than the latter system (MoCl$_5$) does. The molecular weight of the poly(arylacetylene), which is evaluated by the customarily employed osmometry method, ranges from 5000 to one or two millions. The molecular weight of the poly(arylacetylene) may be estimated by examining its intrinsic viscosity. It is preferred that the intrinsic viscosity of the polymer in toluene at 30° C. fall within the range of from 0.1 to 10 dl/g. If the intrinsic viscosity of the polymer is below 0.1 dl/g, the formation of membrane is hard to perform due to the lack of intermolecular cohesive energy of the polymer, while the intrinsic viscosity of more than 10 dl/g fails to give a high quality membrane because a homogeneous dope cannot be obtained due to the insufficient solubility of the polymer.

The semipermeable membrane of this invention may be obtained from the thus described poly(arylacetylene) by two diversified methods. In the first method, which is more preferable than the second method, the polymer is first formed into a membrane and the membrane is then subjected to sulfonation conditions. In the second method, the sulfonation is carried out prior to the membrane formation.

In the method of this invention in which the sulfonation of the polymer is preceded by the formation thereof into membrane form, the poly(arylacetylene) is dissolved in a suitable solvent to form a dope which should be a homogeneous solution having a polymer concentration of 1–30 wt %. The dope is then applied onto the surface of a support or substrate and immersed in a coagulation bath for gelation. In an alternative, the dope may be injected from a spinning jet into a coagulation bath to form hollow fibers. The coagulation is not necessarily carried out immediatly after the formation of membrane. That is, the dope as applied onto the support may be dried in air or any other suitable gases before being immersed into coagulation bath.

The foundamental requirement for the solvent employable to form the dope of the poly(arylacetylene) is that the solvent is capable of dissolving the polymer to give a homogeneous solution containing at least 1 wt % of the polymer. Examples of the solvents for the formation of the dope include N-methylpyrrolidone, N-ethylpyrrolidone, N,N-dimethylacetamide, tetramethylurea, tetrahydrofuran, morpholine, 1,4-dioxane, benzene, toluene, xylene, nitrobenzene, carbon disulfide, carbon tetrachloride, chloroform, dichloromethane, dichloroethane, phenol and metacresol. Particularly preferred solvents are N-methylpyrrolidone, tetrahydrofurane and dimethylacetamide. In the preparation of the dope, an additive for controlling the solubility of the polymer in the solvent or for facilitating the phase separation at the coagulation may be used, if desired. When two or more of the solvents indicated above are used in combination, the mixed solvent may serve both as the solvent and as the additive. Swelling agent or non-solvent which is miscible with the solvent for the dope, such as water, methanol or acetone may also be used as the additive. Water soluble polymers such as polyethylene glycol and polyvinylpyrrolidone can be used as the additive when the coagulation bath contains water. In addition, inorganic salts, which are soluble in the dope, such as salts of alkali metal, alkaline earth metal and ammonium may also be employed for the control of the dope. Lithium chloride, calcium chloride, potassium nitrate and ammonium sulfate are examples of such inorganic salts. The quantity of the additive depends on the quality of the dope but, in general, an excess amount of such inorganic salts may result in non-uniform membranes of a low quality. The concentration of the polymer in the dope ranges from 1 to 30 wt %, preferably 3 to 25 wt %, though it depends on the type of the solvent and additive used. In general, the higher the concentration of the polymer, the higher becomes the selectivity (i.e. property of rejecting the passage of the solute through the membrane is improved), but the rate of flux of the separated fluid becomes low (i.e. the rate of the permeation of the solvent through the membrane is lowered). The amount of the additive ranges from 10 wt % to several times the polymer weight. Inorganic salt additives are normally used in a concentration of 0.1 to 200 wt % of the polymer. The viscosity of the dope, which is strongly influenced by the molecular weight of the polymer, ranges generally from 5 to 1000 poise.

The dope is applied onto a support such as a plate or tube of a glass, stainless steel, aluminum, polyethylene and polypropylene, to shape the dope into a membrane form. The dope may be injected through a nozzle to give hollow fibers. Furthermore, the dope may be applied onto the surface of a microporous support such as a non-woven polyester or nylon or a texture of glass fiber to form a composite membrane which comprises the semipermeable membrane laminated on the microporous support.

The thickness of the membrane is controlled to be 20-500 μm, preferably 30-200 μm. However, the thickness of the membrane formed generally varies depending on the concentration of the dope, the time and temperature of the evaporation step conducted before coagulation, even if the thickness of the deposited dope layer is the same. Coagulation (gelation) may be carried out either immediately after the application of the dope on the support or after subjecting it to drying conditions to allow a part of the solvent to evaporate and to form a dense layer on the top surface of the membrane. Evaporation time and temperature may vary depending on the type of the solvent used and also on the intended properties of the membrane. But, the evaporation time is generally in the range of 1 min to 1 hour at a temperature of $-20°$ to $250°$ C.

The coagulation bath is generally comprised of a non-solvent for the polymer which is miscible with the solvent and additive of the dope. Illustrative of such non-solvents are water, methanol, ethanol, aqueous inorganic salt solutions and mixtures thereof. Coagulation is carried out at a temperature not exceeding the boiling point of the medium of the coagulation bath. For example, when the medium is water, the coagulation should be performed at a temperature of $0°-80°$ C. It takes a few minutes to several hours to complete the coagulation, though the time varies depending on the coagulation temperature. The coagulation is followed by a leaching process to remove the solvent and additive remaining in the membrane. This can be done by rinsing the membrane with running water. Organic solvents incapable of dissolving the polymer may also be employed for leaching purposes.

The structure of the semipermeable membrane thus obtained has an upper dense layer and a lower layer of microporous material and, thus, is anisotropic. If desired, the thus obtained membrane is further heat-treated in order to improve the selectivity and mechanical strength, especially at high temperatures. The heat treatment is performed in a suitable medium such as water, ethylene glycol or an aqueous inorganic salt solution at a temperature of $80°-180°$ C. for a few minutes to one hour.

The membrane formed of the poly(arylacetylene) is then subjected to sulfonation to introduce sulfonic acid groups into at least a part of the benzene nuclei of the poly(arylacetylene). The sulfonation may be carried out in a manner know per se. For example, the membrane is treated with a sulfonation agent such as sulfuric acid, fuming sulfuric acid, sulfur trioxide or chlorosulfuric acid. It is desirable to use sulfuric acid or chlorosulfuric acid in a highly concentrated state. When the membrane to be treated is wet, it is recommended to immerse the membrane first in a diluted acid to avoid the heat generation which results in the degradation of the membrane. In such a case, for example, the membrane is first immersed in a dilute sulfuric acid (5-10%) then in sulfuric acid of moderate concentration (50-60%) before being immersed in highly concentrated sulfuric acid.

The sulfonation temperature and time depend on the intended degree of sulfonation. Generally, the sulfonation is performed at a temperature of $40°-130°$ C., preferably $70°-120°$ C. for one to several hours. When the sulfonation is effected with the use of fuming sulfuric acid, sulfur trioxide or sulfur trioxide/organic solvent, the preferable concentration of sulfur trioxide ranges from 1 to 30 wt %. The control of sulfur trioxide may be done by diluting sulfur trioxide with a suitable amount of sulfuric acid or a suitable organic solvent such as pyridine, dimethylsulfoxide or dimethylformamide. The dilution of sulfur trioxide can also be made with an inert gas such as nitrogen, helium or argon.

The sulfonation with dilute sulfur trioxide is generally carried out at a temperature lower than that employed in the case of sulfuric acid or chlorosulfuric acid. The sulfonation temperature is preferably below $50°$ C. and the sulfonation time is in the range of a few minutes to several hours.

The amount of sulfonic acid introduced into the poly(arylacetylene) membrane can be determined by titration. In obtaining the sulfonic acid content, the sulfonated membrane is first washed well with water to leach out residual sulfuric acid and dried for measuring its weight. The dried membrane is soaked in a mixed solution such as methanol/water (1:1 wt/wt) and then titrated with 1/10 N KOH using phenolphthalein as indicator. From the amount of the KOH solution required for neutralization, the chemical equivalent per gram of sulfonated membrane (M) is calculated. For example, if poly(phenylchloroacetylene) is used as the starting material and if each of the phenyl of the polymer is introduced with one sulfonic acid group, the theoretical chemical equivalent of the sulfonic acid groups of the polymer per gram of thereof ($M_o$) is 1/216.5 (the molecular weight of the recurring unit of the polymer is 216.5). In this case, the sulfonic acid content of the polymer may be expressed in terms of sulfonation value defined by the following equation:

$$\text{Sulfonation value} = M/M_o \times 100 \, (\%)$$

in which M is the chemical equivalent measured by titration as described above and $M_o$ is the theoretical chemical equivalent (i.e. 1/216.5 in the case of poly(phenylchloroacetylene)). It will be seen that the sulfonation value can exceed 100% because two or more sulfonic acid groups may be introduced to one benzene nucleus of the polymer. 100% sulfonation value is identical to the sulfonic acid content of 1 mol per mol of the aryl group of the polymer. It is preferred that the semipermeable membrane have a sulfonation value of 0.1 to 100%, more preferably 1 to 50%, i.e. 0.001 to 1 mole, preferably 0.01 to 0.5 mol, of sulfonic acid group per mole of aryl group of the poly(arylacetylene).

Another method for the preparation of the semipermeable membrane of this invention includes introducing sulfonic acid groups into a poly(arylacetylene) before the polymer is shaped into a membrane form. More specifically, the poly(arylacetylene) is dissolved in a suitable organic solvent to form a solution of the polymer having a polymer concentration of preferably 10% or less. Illustrative of the solvents are organic halides such as carbon tetrachloride and dichloroethane and ethers such as tetrahydrofuran and dioxane. A polymer concentration of more than 10% is not advantageous because the sulfonation reaction cannot homogeneously proceed due to high viscosity of the solution. The solution of the polymer is charged in a reactor to which sulfur trioxide diluted with an organic solvent such as pyridine or dimethylformamide or with an inert gas such as nitrogen, helium or argon is introduced for the sulfonation of the polymer. The sulfonation is carried out at a temperature of below 50° C. for no more than 1 hour. After the completion of the reaction, the sulfonated polymer is recovered by precipitation with methanol, followed by filtration and drying. The sulfonated poly(arylacetylene) thus obtained is shaped into a membrane form in the same manner as described above. An organic solvent such as N-methylpyrrolidone, tetrahydrofuran or dimethylformamide is suitably employed for the preparation of the dope of the polymer. The coagulation of the dope may be conducted in the same way as described above.

It is preferable to heat treat the semipermeable membrane obtained by either method described in the foregoing to improve the selectivity and mechanical strength so that the membrane may be used in a stable manner for a long period of time. The heat treatment may be performed at a temperature of 50°–200° C., preferably 80°–180° C. in boiling water or any suitable heating medium within an autoclave or so on. The semipermeable membrane of this invention may be formed into a module suitable for reverse osmosis or ultrafiltration. The semipermeable membrane of this invention exhibits outstanding characteristics, namely a high resistance to heat, acids, alkalis and oxidizing agents and, thus, lends itself to numerous applications in many fields such as a separator of a power cell.

The sulfonic acid groups contained in the membrane can be modified, by neutralization with various alkalis, into sulfonate form of the general formula:

$$-SO_3Z$$

wherein Z stands for a cation such as metal ion or ammonium ion. The ammonium ion may be represented by:

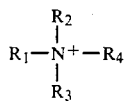

wherein $R_1$–$R_4$ each stand for hydrogen or an alkyl having 1–16 carbon atoms. The following polyethylene polyamine may also be used for the modification of the sulfonic acid groups of the semipermeable membrane:

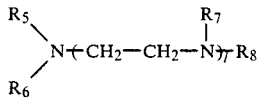

wherein $R_5$–$R_8$ each stand for hydrogen or an alkyl having 1–6 carbon atoms and l is a positive integer. Polyethylene imines are also applicable for this purpose. Examples of the metal ions include ions of an alkali metal such as Li, Na, or K and an alkaline earth metal such as Mg or Ca and other metals such as Al. When the metal of the ions used is multivalent, the metal ions may form intra- or intermolecular crosslinking.

The following examples will further illustrate the present invention.

EXAMPLE 1

Preparation of Poly(phenylchloroacetylene), (PPCA)

Into 1 l of carbon tetrachloride purified under dry nitrogen 30 mol of Mo(CO)$_6$ was added and then exposed to UV radiation (300 W, mercury bulb) for 1 hour at 30° C. 10 mol of phenylchloroacetylene and a given quantity of chlorobenzene (standard material for gas-chromatography) were added to the resulting mixture for reaction therewith. The polymerization was performed at 30° C. for 24 hours. The conversion determined by gaschromatography was 83%. Purification of the resulted polymer was carried out by precipitation in a large amount of methanol. The yield of dry polymer is 72%. The molecular weight determined by osmometry is about 400,000. The intrinsic viscosity of the polymer in toluene at 30° C. was 2.69 g/dl.

Preparation of Membrane of PPCA 7.0 g of the thus prepared polymer, 37.2 g of tetrahydrofuran and 55.8 g of N-methyl-2-pyrrolidone were mixed with stirring for several days to obtain a transparent dope. The dope was applied by an applicator onto a glass plate placed horizontally to a thickness of 450 μm, and allowed to stand as such for 4 min to evaporate a part of the solvent. It was then immersed in an ice-water bath for gelation, followed by washing with a running water for overnight to remove the residual solvent. The membrane obtained was semi-transparent and its thickness was 70 μm.

Sulfonation of PPCA Membranes

The resulting membrane was treated in a hot water (90° C.) for 2 hours. Then the membrane was immersed in 50% H for 10 min and in concentrated H$_2$SO$_4$ (more than 98%) for another 10 min. Sulfonation was carried out using 25% fuming sulfuric acid under the conditions indicated in Table 1. After sulfonation, each membrane was immersed in a dilute sulfuric acid followed by leaching with running water overnight. The sulfonation value was determined for each of the dried membranes which had been crushed and dispersed in a mixture of methanol and water (1:1). Titration with 1/10 N KOH solution was done to determine the sulfonation value. The results are shown in Table 1.

Filtration Test of PPCA Membranes

The membranes were tested using a bath type cell for reverse osmosis. The volume of the cell is 1.4 liter and the effective membrane area in the cell is 12.6 cm$^2$. Test solution were aqueous solutions of polyethylene glycol(3000 ppm) and Na$_2$SO$_4$ (1000 ppm). The pressure was 6 kg/cm$^2$. Evaluation was made in terms of the rate of flux (amount (m$^3$) of the solvent passed per m$^2$ of the membrane per day) and solute rejection (%) which was measured in terms of TOD (total oxygen demand) in the case of polyethylene glycol and in terms of electrical conductivity in the case of Na$_2$SO$_4$. The results were shown in Table 1. In Table 1, No. 10, No. 11 and No. 12 are reference samples. No. 10 and No. 11 are membranes made of polysulfone and No. 12 are non-sulfonated PPCA membrane.

TABLE 1

| | Sulfonation time (min) | Sulfonation value (%) | Polyethylene glycol (M.W = 2000, 3000 ppm) | | NO$_2$SO$_4$ (1000 ppm) | |
|---|---|---|---|---|---|---|
| | | | Flux rate* | Rejection (%) | Flux rate* | Rejection (%) |
| No. 1 | 5.0 | 4.0 | 1.4 | 88.7 | 1.5 | 82.1 |
| No. 2 | 10.0 | 9.3 | 0.7 | 95.1 | 0.7 | 90.7 |
| No. 3 | 20.0 | 32.0 | 0.24 | 98.0 | 0.24 | 95.1 |
| No. 10 | — | — | 1.9 | 0 | 1.9 | 0 |
| No. 11 | — | — | 2.4 | 0 | 2.4 | 0 |

TABLE 1-continued

| | Sulfo-nation time (min) | Sulfo-nation value (%) | Polyethylene glycol (M.W = 2000, 3000 ppm) | | NO$_2$SO$_4$ (1000 ppm) | |
|---|---|---|---|---|---|---|
| | | | Flux rate* | Rejection (%) | Flux rate* | Rejection (%) |
| No. 12 | — | — | 1.9 | 47.0 | 1.9 | 38.0 |

*m$^3$/m$^2$/day

EXAMPLE 2

The membrane of No. 2 in Table 1 was immersed in an aqueous ammonia for 30 min, followed by leaching with deionized water. The appearance and mechanical strength were not appreciably changed. The filtration test was carried out in the same manner as Example 1. The results were as summarized in Table 2.

TABLE 2

| Test Solution | Flux(m$^3$/m$^2$/day) | Rejection (%) |
|---|---|---|
| Polyethylene glycol (M.W. 2000, 3000 ppm) | 1.2 | 96.5 |
| Na$_2$SO$_4$ (1000 ppm) | 1.2 | 91.0 |

EXAMPLE 3

Phenylmethylacetylene was polymerized using TaBr$_5$ as catalyst and toluene as solvent. The relative amount of these compounds is the same as that employed in Example 1, but the temperature was kept 80° C. throughout the polymerization. After completion of the polymerization, the resulting poly(phenylmethylacetylene)(PPMA) was purified by precipitation in methanol followed by filtration and drying. The yield was 89%. The intrinsic viscosity of the polymer in toluene at 30° C. was 2.50 g/dl.

5 g of the thus obtained PPMA was dissolved in 95 g of carbon tetrachloride in the atmosphere of dry nitrogen gas. 25% of fuming sulfuric acid was added dropwise into the PPMA solution in the given quantity indicated in Table 3 with vigorous stirring at a temperature in the range of 20°–25° C. After the addition of the sulfuric acid, the reaction was further continued for 2 hours at 30° C. After completion of the reaction, the residual fuming sulfuric acid was hydrated by adding a small amount of water. The sulfonated PPMA was purified by precipitation in methanol, followed by sufficient leaching with deionized water until the water after washing showed no acidity. The sulfonation value of the dried sulfonated PPMA was evaluated in a similar manner as described above to give the results shown in Table 3. 3.5 g of the sulfonated PPMA, 25 g of tetrahydrofuran, 25 g of N,N-dimethylformamide and 2 g of LiCi were mixed with stirring to obtain a transparent dope. The dope was processed in the same manner as that in Example 1 to obtain membranes formed of the sulfonated PPMA. The filtration test was carried out in the same manner as above. The results were as shown in Table 3.

TABLE 3

| | Fuming sulfuric acid (ml) | Sulfonation value (%) | Polyethylene glycol (M.W = 2000, 3000 ppm) | | Na$_2$SO$_4$ (1000 ppm) | |
|---|---|---|---|---|---|---|
| | | | Flux rate* | Rejection (%) | Flux rate* | Rejection (%) |
| No. 1 | 5 | 6 | 1.1 | 96.1 | 1.1 | 86.5 |
| No. 2 | 10 | 24 | 0.7 | 98.2 | 0.7 | 91.0 |
| No. 3 | 30 | 30 | 0.4 | 99.0 | 0.4 | 96.2 |

*m$^3$/m$^2$/day

We claim:

1. A semipermeable membrane comprising a semipermeable film of a polymeric material, said film having a surface comprised of a poly (arylacetylene) having at least a part of its benzene nuclei introduced with sulfonic acid groups, said poly (arylacetylene) being represented by the following structural formula (I):

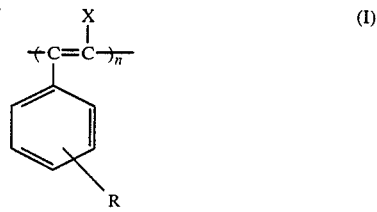

wherein X stands for Cl, Br or CH$_3$, R stands for H or CH$_3$ and n is a positive integer.

2. A semipermeable membrane as defined in claim 1 and obtained by subjecting a semipermeable film of a polymeric material formed with the poly (arylacetylene) of the formula (I) to sulfonation conditions.

3. A semipermeable membrane as defined in claim 1 and obtained by sulfonating the poly(arylacetylene) of the formula (I), and forming the sulfonated product into a membrane.

4. A semipermeable membrane as defined in any one of claims 1 through 3, wherein the poly(arylacetylene) of the formula (I) has a molecular weight of at least about 5000.

5. A semipermeable membrane as defined in claim 4 and having a sulfonic acid group content of between 0.001 and 1 mole per mole of the aryl group of the poly(arylacetylene) of the formula (I).

6. A semipermeable membrane as defined in claim 4, wherein said sulfonic acid groups are modified with a cation.

7. A semipermeable membrane as defined in claim 6, wherein said cation is a member selected from the group consisting of metal ions, ammonium or alkylammonium ions represented by the formula:

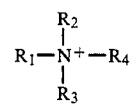

wherein R$_1$–R$_4$ each stand for hydrogen or an alkyl group having 1-16 carbon atoms, polyethylene polyamines represented by the formula:

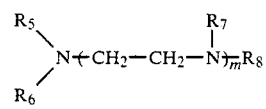

wherein R$_5$–R$_8$ each stand for hydrogen or an alkyl having 1-6 carbon atoms and m is a positive integer, polyethylene imines and mixtures thereof.

* * * * *